US008745698B1

(12) United States Patent
Ashfield et al.

(10) Patent No.: US 8,745,698 B1
(45) Date of Patent: Jun. 3, 2014

(54) DYNAMIC AUTHENTICATION ENGINE

(75) Inventors: James M. Ashfield, Charlotte, NC (US); David C. Shroyer, Matthews, NC (US); Eric Charles McConnell, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 853 days.

(21) Appl. No.: 12/481,264

(22) Filed: Jun. 9, 2009

(51) Int. Cl.
*G06F 7/04* (2006.01)
*G06F 15/16* (2006.01)
*G06F 17/30* (2006.01)
*H04L 29/06* (2006.01)
*H04N 7/16* (2011.01)

(52) U.S. Cl.
USPC .............................. 726/4; 726/26

(58) Field of Classification Search
USPC ............................................ 726/4, 26
See application file for complete search history.

(56) References Cited

U.S. PATENT DOCUMENTS

| | | | |
|---|---|---|---|
| 6,263,447 B1 | 7/2001 | French et al. | |
| 6,957,334 B1* | 10/2005 | Goldstein et al. | 713/170 |
| 7,467,401 B2* | 12/2008 | Cicchitto | 726/4 |
| 7,774,270 B1* | 8/2010 | MacCloskey | 705/38 |
| 2003/0212637 A1* | 11/2003 | Turner | 705/45 |
| 2005/0086068 A1* | 4/2005 | Quigley et al. | 705/1 |
| 2005/0216768 A1* | 9/2005 | Eppert | 713/201 |
| 2006/0036868 A1* | 2/2006 | Cicchitto | 713/182 |
| 2008/0005037 A1* | 1/2008 | Hammad et al. | 705/67 |
| 2009/0007245 A1* | 1/2009 | Schultz | 726/5 |
| 2009/0037983 A1* | 2/2009 | Chiruvolu et al. | 726/4 |
| 2009/0178120 A1* | 7/2009 | Royyuru et al. | 726/4 |
| 2009/0249477 A1* | 10/2009 | Punera | 726/18 |
| 2009/0265773 A1* | 10/2009 | Schultz | 726/7 |
| 2009/0305667 A1* | 12/2009 | Schultz | 455/410 |
| 2010/0114776 A1* | 5/2010 | Weller et al. | 705/44 |
| 2011/0320342 A1* | 12/2011 | Kremen | 705/38 |
| 2012/0216260 A1* | 8/2012 | Crawford et al. | 726/5 |
| 2012/0233072 A1* | 9/2012 | Calman et al. | 705/44 |

OTHER PUBLICATIONS

E. J. Potter, Customer Authentication: The Evolution of Signature Verification in Financial Institutions, 2002, Journal of Economic Crime Management, vol. 1, Iss. 1, 1-19.*

(Continued)

*Primary Examiner* — Azizul Choudhury
*Assistant Examiner* — Tariq Najee-Ullah
(74) *Attorney, Agent, or Firm* — Michael A. Springs; Moore & Van Allen PLLC; Nicholas C. Russell

(57) ABSTRACT

Embodiments of the invention relate to apparatuses and methods for identity verification. For example, in one embodiment, a financial institution has a system to generate authentication questions to be used when authenticating a customer when the customer is trying to access and/or use the customer's account. The authentication system is configured to ask one or more authentication questions each time the customer tries to access or use the account, where the authentication questions are generally out-of-wallet questions that constantly change from one authentication attempt to the next. For example, in one embodiment, the questions include behavioral, historical, and transaction based questions generated from information available about a customer's financial account. In some embodiments, the authentication engine is configured to generate authentication questions based at least partially on a risk rating associated with the authentication request and/or on the communication channel from which the request is received.

29 Claims, 6 Drawing Sheets

(56) References Cited

OTHER PUBLICATIONS

T. G. Calderon et al., Modeling an intelligent continuous authentication system to protect financial information resources, Jun. 2006, International Journal of Accounting Information Systems, vol. 7, Iss. 2, 91-109.*

R.P. Sundarraj, Modeling an intelligent authentication system to protect financial information , International Journal of Accounting Information Systems, vol. 7, Issue 2, Jun. 2006, pp. 110-112.*

M. Alles et al., Continuous monitoring of business process controls: A pilot implementation of a continuous auditing system at Siemens, International Journal of Accounting Information Systems, vol. 7, Issue 2, Jun. 2006, pp. 137-161.*

IDology Inc., "IDology Publishes Whitepaper on Electronic Age Verification Technology to Examine How Age and Identity Verification Solutions Protect Children Online" Jan. 2, 2007 Press Release, http://www.idology.com/press-release/idology-publishes-whitepaper-on-electronic-age-verification-technology-to-examine-how-age-and-identity-verification-solutions-protect-children-online.

IDology Inc., "IDology Publishes Whitepaper on Electronic Age Verification Technology to Examine How Ecommerce Companies Can Better Balance Security and Profit", Feb. 5, 2007 Press Release, http://www.idology.com/press-release/idology-demonstrates-its-identity-verification-solutions-at-symantec-booth-during-rsa-conference.

IDology Inc., http://www.idology.com.

* cited by examiner

ONLINE BANKING – FUNDS TRANSFER

SECURE QUESTIONS

FOR YOUR PROTECTION, WE WILL NEED TO AUTHORIZE THIS ACTIVITY BY ANSWERING SOME ADDITIONAL SECURITY QUESTIONS. PLEASE ANSWER THE QUESTIONS BELOW:

WHEN YOU MAKE A DEPOSIT VIA OUR ATMS YOU MAKE THOSE DEPOSITS AT ONE SPECIFIC ATM 95% OF THE TIME. PLEASE SELECT THAT ATM LOCATION:

○ ATM 1

○ ATM 2

○ ATM 3

○ ATM 4

SUBMIT

CANCEL

FIG. 6

DYNAMIC AUTHENTICATION ENGINE

FIELD

In general, embodiments of the invention relate to methods and apparatuses for customer authentication.

BACKGROUND

As technology evolves, a large majority of everyday customer affairs are conducted over different channels of communication and media. For example, many financial institutions offer online-banking services where the institution's customers can access their accounts, pay bills, and transfer money to other parties over the Internet. A similar example in a different channel of communication is telephone or mobile banking where customers make account inquiries and transactions, etc., over their phone or other handheld communications device. Another example that most people encounter is using "bank cards" (e.g., check cards, credit cards, ATM/debit cards, etc.) or other payment devices to purchase goods, withdraw money or access a personal bank account from an Automated Teller Machine (ATM), a Point-of-Sale (POS) terminal, or other electronic terminal/kiosk. As a result, in today's mobile world, companies are issuing login IDs and passwords so that customers can access goods and services at their own convenience.

As the number and types of different business channels increase, the threat of misrepresentation and identity theft increases as well. It is more difficult to authenticate and verify customers when many customer transactions are not in-store as before. Even in-store transactions are difficult to verify as bank cards may be misappropriated or misused.

For example, if a customer loses his or her account number, login ID, password, bank card, etc., or if any of these are misappropriated, then another person may be able to gain access to that customer's accounts for their own personal gain. This problem even presents itself when another party makes purchases directly at a store since a merchant does not always request additional identification or proof that the purchaser is actually the card holder.

In another example, in a conventional financial institution setting, if a customer's bank card is misappropriated, an individual only needs to misappropriate the customer's personal identification number (PIN) or password in order to access the customer's banking account over an ATM. In addition, the thief could log-on to the customer's banking account over a telephone network or the Internet through mobile banking or online banking and transfer funds to other accounts, send checks, etc. Also, the thief could easily use the bank card at retail POS devices to purchase goods and services.

Some credit card companies have attempted to combat this problem by presenting authentication questions or queries to the user such as "Out-of-Wallet" (OOW) questions in order to attempt to verify that the card holder is indeed the person listed on the card. OOW questions are generally questions where the answers to the questions are not typically listed on the debit or credit card, or carried in the cardholder's wallet. In the past, OOW questions have been static and semi-static, where the answers do not change often. An example of a static question is "What is your birthday?" The answer to this question will always remain the same. An example of a semi-static question is "What is your address?" The answer can change, but remains the same for typically a long period of time and is, therefore, often readily available to members of the public. Although asking these types of questions provides an added layer of security, it is still often not very effective because the answers may be easy to figure out, since the questions and the answers remain the same for long periods of time and/or may be readily available to others besides the cardholder.

Furthermore, many individuals engage in an attempt to gather information from a customer that the customer uses for authentication, such as account numbers, social security numbers, usernames, passwords, personal identification numbers, and other personal information that may be the subject of an OOW question or other authentication question, such as the customer's mother's maiden name, the customer's birthdate, customer's zip code, etc.

Further, OOW questions are currently expensive to implement. There are several third-party OOW question generation services that cost per question. For all these reasons, customers and merchants alike desire more effective and efficient systems and methods for customer authentication.

SUMMARY

Embodiments of the invention generally relate to apparatuses and methods for identity verification. For example, in one embodiment, a financial institution has a system to generate authentication questions to be used when authenticating a customer when the customer is trying to access and/or use the customer's account. The authentication system is configured to ask one or more authentication questions each time the customer tries to access or use the account, where the authentication questions are generally out-of-wallet questions that constantly change from one authentication attempt to the next. For example, in one embodiment, the questions include behavioral, historical, and transaction based questions generated from information available about a customer's financial account. In some embodiments, the authentication engine is configured to generate authentication questions based at least partially on a risk rating associated with the authentication request and/or on the communication channel from which the request is received.

More particularly, embodiments of the invention provide a system having a communication interface and a processor operatively coupled to the communication interface. In one embodiment, the communication interface is configured to receive requests requiring authentication that a person is an authorized person who is authorized to access or use an account. In one embodiment, the processor configured to use the communication device to provide the person with one or more authentication questions each time a request is received requiring authentication that a person is an authorized person who is authorized to access or use the account, and wherein the processor is configured to provide the one or more authentication questions such that at least one of the one or more authentication questions is not repeated in two or more consecutive requests.

In one embodiment, the processor is further configured to access a datastore including information about the account or the authorized person, wherein the information about the account or the authorized person is updated in real time or near real time. In such an embodiment, the processor may be further configured to generate an authentication question based on information about the request and information stored in the datastore about the account or the authorized person. In some embodiments, the one or more authentication questions comprise a question about a prior use of the account, such as a question about a prior transaction involving the account or a question about a behavior of an authorized person when using the account (e.g., a question about an authorized person's use of one or more automated teller machines or about the person's most-frequented merchants).

In some embodiments of the system, the account is maintained by an institution and the processor is further configured to access a datastore maintained by the institution, the datastore including information gathered by the institution about use of the account or behaviors of an authorized person when using the account. In such an embodiment, the processor may be further configured to generate one or more authentication questions from the information stored in the datastore. In another such embodiment, the processor may be configured to determine that there is not sufficient information in the datastore to generate the one or more authentication questions for a request requiring authentication. In such instances, the processor may be further configured to use the communication interface to communicate with a third-party provider of authentication questions or information about an authorized person that can be used to generate one or more authentication questions, and then provide one or more authentication questions based at least partially on authentication questions or information received from the third-party provider. In one embodiment, the third-party provider is a credit reporting agency, a merchant, or another financial institution.

In some embodiments of the system, the communication device is configured to receive the requests through a plurality of different communication channels. In such embodiments, the processor may be configured to provide the one or more authentication questions based at least partially on the communication channel from which a request is received. For example, in one embodiment, the plurality of communication channels include a telephone system channel, a customer service representative channel, an online channel, and a mobile channel.

In some embodiments of the system, the processor is configured to provide the one or more authentication questions based at least partially on the location or account access rights of the person requesting authentication. For example, in one embodiment, the requests requiring authentication include a request to authenticate a person that already has access to an account, but is attempting to make certain high risk transaction using the that requires additional authentication. In such an embodiment, the processor may be configured to provide one or more authentication questions to the person where the questions are designed so that they cannot be answered using information available via the person's access to the account.

In some embodiments of the system, the processor is further configured to determine a risk rating for each request and then provide one or more authentication questions for a request based at least partially on the risk rating for the request. For example, in one embodiment, the processor is configured to determine a risk rating for a request based at least partially on the amount of a requested transaction, an amount associated with the account, a channel of communication from which the request was received, a location of the person requesting authentication, a type of account, the account's history of misrepresentation, or a type of transaction.

In some embodiments of the system, the processor is configured to store, in a memory, a history of the one or more authentication questions provided for the account in the past. In this way, in some embodiments, the processor can be configured to provide the one or more authentication questions to the person based at least partially on the history. For example, in one embodiment, the processor is configured to use the history so as to not provide the same one or more authentication questions to a person for the account within a predefined period of time or number of login attempts.

In some embodiments of the system, the processor is configured to track the response time needed for the person to provide an answer to the authentication question. In such an embodiment, the processor may be further configured to determine an authentication decision based at least partially on the answer and the response time. In some embodiments, the maximum response time allowed to successfully respond to an authentication question is based at least partially on the requests risk rating.

In some embodiments of the system, the processor is configured to perform one or more functions described above by executing computer-executable program code embodied in a computer-readable medium, wherein the computer-executable program code is configured to instruct the processor to perform the one or more functions.

Embodiments of the present invention also provide a system including a communication interface configured to receive a request to authenticate that a person is an authorized person who is authorized to access or use an account, and a processor operatively coupled to the communication interface and configured to: (i) access a datastore including information about the account or a person authorized to access or use the account, wherein the datastore information about the account or the person authorized to access the account is updated in real time or near real time; (ii) determine an authentication question based on information about the request and information stored in the datastore about the account or the person authorized to access or use the account; and (iii) use the communication interface to provide the authentication question to the person.

Embodiments of the present invention also provide a method involving: (i) using a communication interface to receive electronic requests requiring authentication that a person is an authorized person who is authorized to access or use an account; and (ii) using a processor to automatically provide, in response to a request, one or more authentication questions such that any two consecutive requests requiring authentication of the same person or for the same account do not result in all of the same one or more authentication questions or all of the same correct answers to the one or more authentication questions.

BRIEF DESCRIPTION OF THE DRAWINGS

Figure 1:
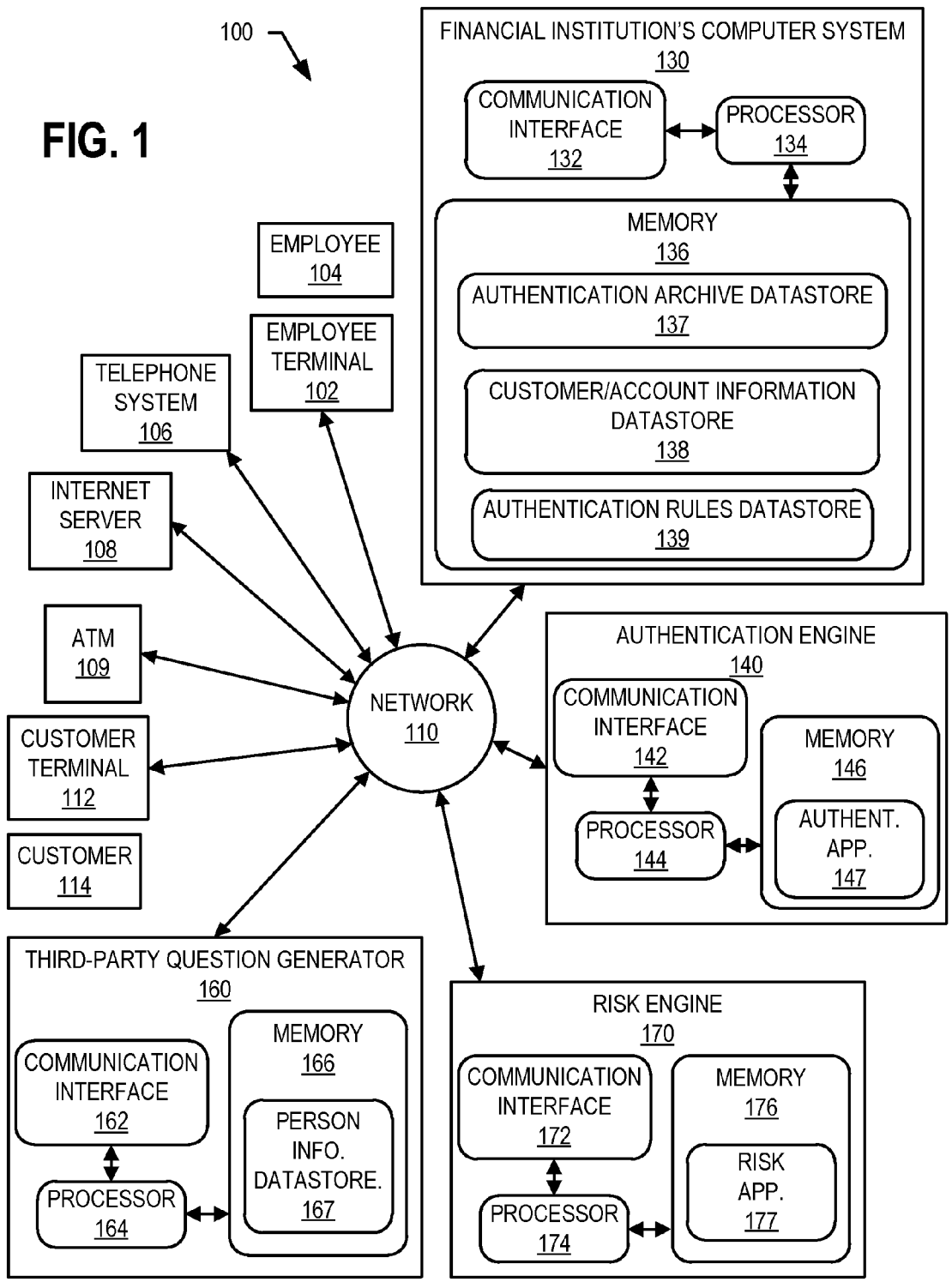
Figure 2:
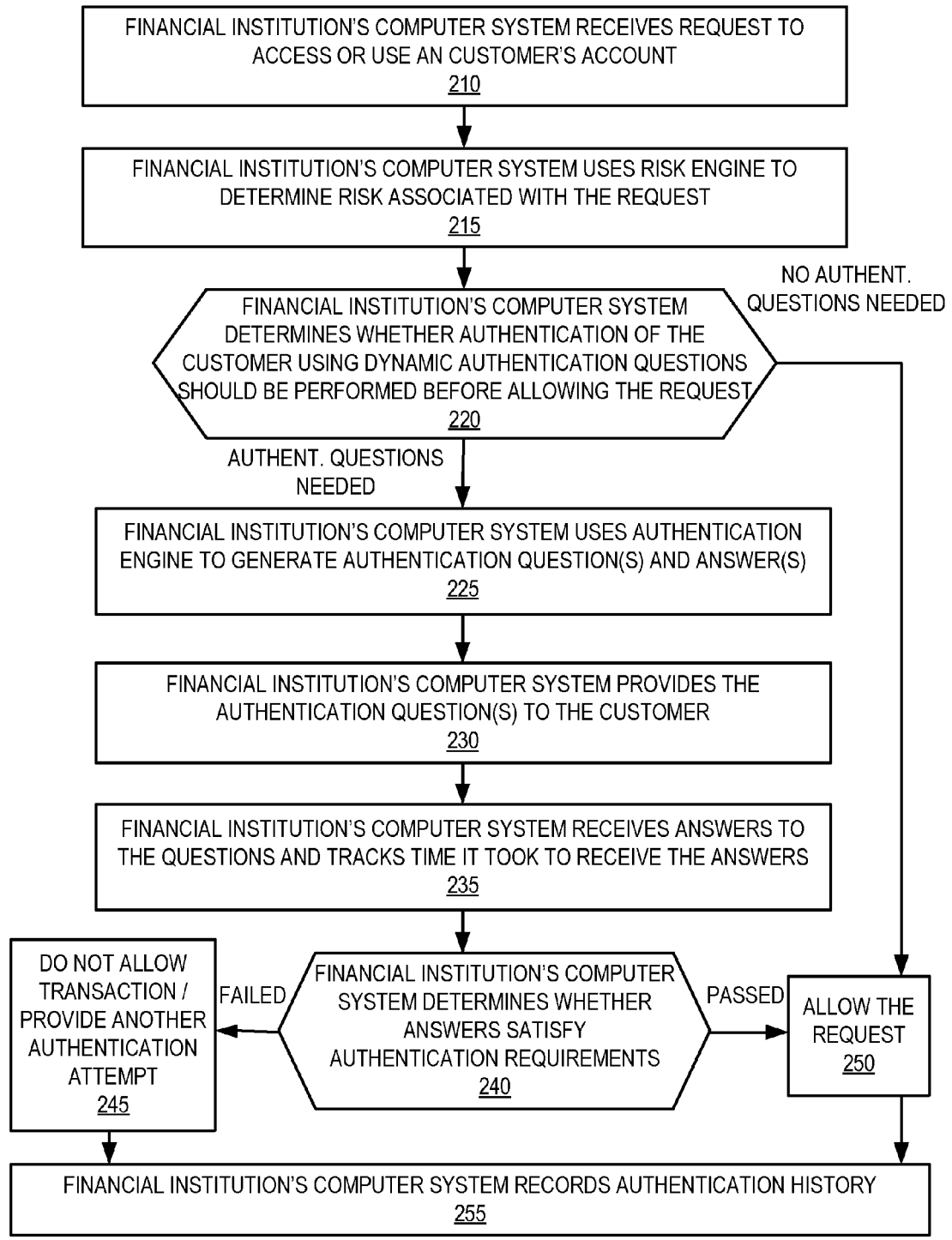
Figure 3:
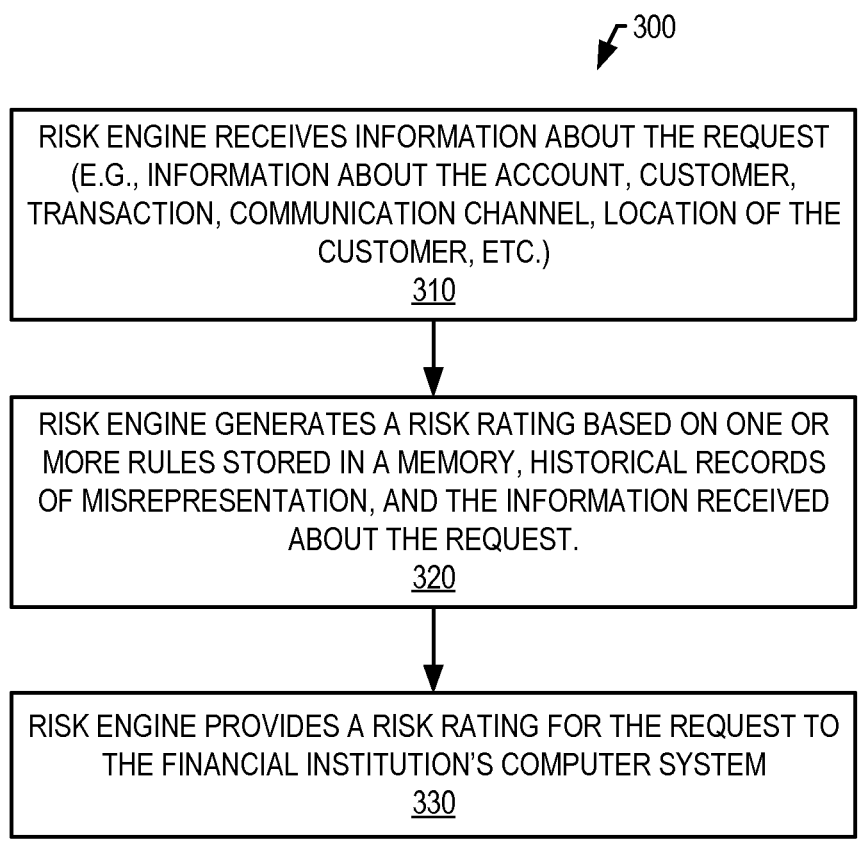
Figure 4:
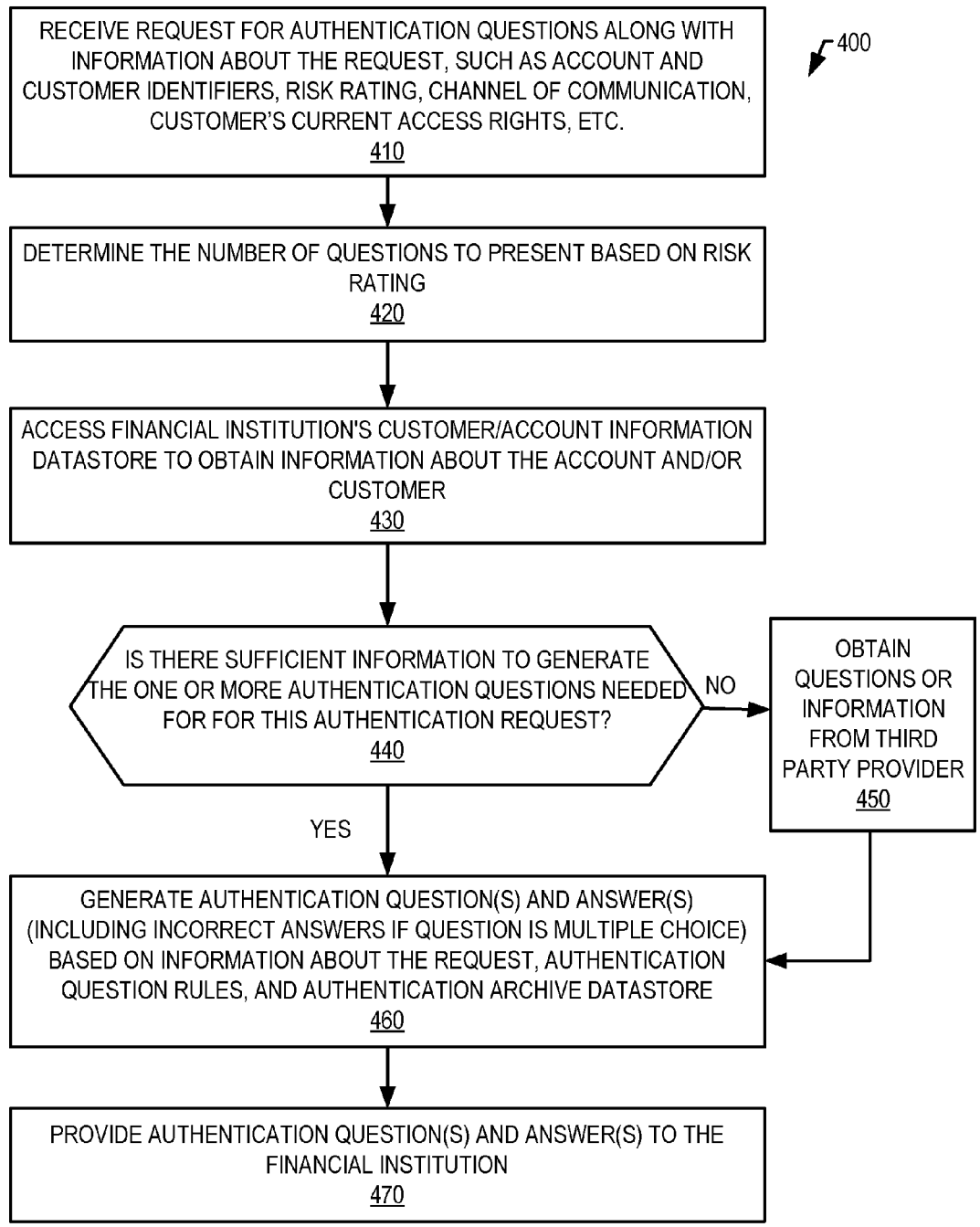
Figure 5:

Having thus described embodiments of the invention in general terms, reference will now be made to the accompanying drawings, wherein:

FIG. 1 is a block diagram illustrating a customer authentication system, in accordance with an embodiment of the present invention;

FIG. 2 is a flow diagram illustrating a method of customer authentication, in accordance with an embodiment of the present invention;

FIG. 3 is a flow diagram illustrating a method of generating a risk rating associated with each request to access or use an account, in accordance with an embodiment of the present invention;

FIG. 4 is a flow diagram illustrating a method of generating authentication questions, in accordance with an embodiment of the present invention;

FIG. 5 is an illustration of a graphical user interface showing one step in the authentication of a customer attempting to log-in to the customer's online banking account at a bank's website, in accordance with an embodiment of the present invention; and FIG. 6 is an illustration of a graphical user interface showing one step in the authentication of a customer attempting to use the customer's online banking account to transfer funds from one of the customer's bank accounts, in accordance with an embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a method (including a business process, computer-implemented method, etc.) or apparatus (including a system, computer program product, device, etc.), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code (i.e., computer-readable instructions) embodied in the medium.

Any suitable computer-readable medium may be utilized. The computer-readable medium may be, for example but not limited to, a tangible electronic, magnetic, optical, electromagnetic, infrared, or semiconductor system, apparatus, or device. More specific examples of the computer-readable medium include, but are not limited to, the following: an electrical connection having one or more wires; or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Computer-executable program code for carrying out operations of embodiments of the present invention may be written in an object oriented, scripted or unscripted programming language such as Java, Perl, Smalltalk, C++, or the like. However, the computer-executable program code for carrying out operations of embodiments of the present invention may also be written in conventional procedural programming languages, such as the "C" programming language or similar programming languages.

Embodiments of the present invention are described below with reference to flowchart illustrations and/or block diagrams of methods and apparatuses (systems, computer program products, devices, etc.). It will be understood that each block of the flowchart illustrations and/or block diagrams, and/or combinations of blocks in the flowchart illustrations and/or block diagrams, can be implemented by computer program instructions embodied in the computer-executable program code. The computer-executable program code may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

The computer-executable program code may be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As described generally above, embodiments of the invention provide apparatuses and methods for authenticating persons, such as customers, by asking dynamic authentication questions, such as OOW questions, where the questions and/or answers change from one authentication request to the next. Since the authentication questions and/or answers constantly change, are rarely repeated, and are generally of the type where the answer would be difficult for anyone other than an authorized person to know, embodiments of the invention may greatly reduce misrepresentations. Furthermore, the incentive for engaging in misleading activities of attempting to acquire sensitive information by masquerading as a trustworthy entity will also be greatly reduced since any information gathered through traditional misleading process of attempting to acquire sensitive information by masquerading as a trustworthy entity will seldom be useful for obtaining authentication, due to the fact that the questions that will be asked in the authentication process will be unpredictable and may rarely repeat. Furthermore, even where a question is repeated, many of the questions will be dynamic in nature in that the answers will often change.

In some embodiments, where available, the institution uses its own information about a customer or a customer account to generate these dynamic authentication questions. For example, in one embodiment where the institution is a financial institution that has access to information about a customer based on the customer's use of a credit or debit account, some of the questions may ask about recent account activity, such as the amount of a recent transaction, the retailer or product involved in a recent transaction, the location of a recent transaction, the date of a recent transaction, and/or the like, or about recent customer behaviors associated with the account, such as the customer's preferred retailer, ATM, bank branch, product, brand, activity, and/or the like.

Where the institution does not have the information available to generate enough dynamic authentication questions, some embodiments of the invention may then contact a third-party, such as a credit reporting agency or other institution, to obtain dynamic authentication questions and/or information that can be used to generate dynamic authentication questions.

In some embodiments, the time required to answer an authentication question also plays into the system's authentication decision. In some embodiments, the type and/or number of authentication questions can often vary and, in some instances, the type of question, number of questions, and/or time to answer a question depends upon a risk rating for the transaction or authentication request.

As also described above, for many institutions, it's important to be able to efficiently and effectively authenticate customers over different channels of communication and media. In this regard, some embodiments of the present invention are directed to systems, methods, and computer program products for authenticating customers involved in transactions over telephone, ATM, Internet, retail POS, and any other possible communication channels. In one embodiment, the same authentication engine is used to generate and judge the answers to authentication questions for all of the different communication channels in which the institution operates. In this way, the authentication process can be consistent across all of the different ways that a customer interacts with the institution and, therefore, can become familiar to the customer and provide the customer with comfort that he or she is dealing with the institution and not a malicious entity posing as the institution. In some embodiments, the type of question, number of questions, and/or time to answer a question depends upon the communication channel being used by the customer to access an account and/or on the customer's current access rights to account information.

Referring now to the figures, FIG. 1 provides a block diagram illustrating an example of a customer authentication system 100 in accordance with an embodiment of the invention. As illustrated, some embodiments of the customer authentication system 100 involve authentication of a person, such as customer 114, who is, for example, trying to access or use a customer account maintained by a financial institution 130.

As used herein, the term "financial institution" refers to an institution that provides financial services for its customers or members by processing financial transactions for its customers or members. Financial institutions can include, but are not limited to, banks, building societies, credit unions, stock brokerages, asset management firms, savings and loans, money lending companies, insurance brokerages, insurance underwriters, dealers in securities, and similar businesses. Retail, wholesale, and service businesses, as well as manufacturers, may also process financial transactions as disclosed herein. The terms "financial transaction," "financial institution," "bank," and any similar terms are used herein in their broadest sense and are intended to encompass all such possibilities unless the context explicitly states otherwise. Although exemplary embodiments of the invention described herein are generally described in terms of financial institutions, other embodiments of the invention can be used for authenticating customers or other persons for any institution.

It is also understood that, although some example embodiments described herein refer to authenticating a person so that the person can access or use a financial account, such as a checking account, deposit account, savings account, other bank account, brokerage account, and/or the like, other embodiments of the invention may involve authentication of persons for other purposes, such as for allowing access to online accounts, retail accounts, tax accounts, government accounts, customer accounts, record accounts, email accounts, utility accounts, and/or any other system, account, device, service, or area requiring authorization.

In the embodiment of the invention illustrated in FIG. 1, the customer authentication system 100 generally involves a financial institution's computer system 130, an authentication engine 140, a risk engine 170, a third-party question generator 160, and devices for interacting with a customer 114 through one or more different channels of communication, such as a customer terminal 112, an ATM 109, an Internet server 108, a telephone system 106, and/or an employee terminal 102. Although FIG. 1 illustrates each of these systems as separate and distinct from one another, it will be understood that, in some embodiments, the separation is only conceptual and one or more of these systems are combined with one or more of the other systems. For example, in one embodiment, at least portions of the internet server 108, employee terminal 102, ATM 109, telephone system 106, network 110, authentication engine 140, and/or risk engine 170 are part of the financial institution's computer system 130. In such embodiments where two or more of the illustrated systems are combined, the two systems may share at least some system resources, such as processors, communication interfaces, and memory devices. In other embodiments, the systems illustrated in FIG. 1 are actually separate and distinct from one another. Even where the systems are separate, they may, in some embodiments, be controlled by the same institution, such as a financial institution, directly or through an agent, or may, in other embodiments, be controlled by different institutions or other entities. Likewise, it will be apparent by one of ordinary skill in the art in view of this disclosure that, in many cases, some of the procedures described herein as being performed by one system illustrated in FIG. 1 may, in some embodiments, be performed by another system illustrated in FIG. 1.

In general, the customer 114 (or other person, such as an employee 104 of the financial institution, or an unauthorized person/device) attempts to access or use an account maintained by the financial institution's computer system 130. For example, the customer 114 may desire to obtain information about the account or engage in a transaction involving the account. For example, a customer 114 may desire to access his or her checking account, savings account, investment account, online banking account, and/or the like to obtain information about the account or to make a transaction, such as a purchase, funds transfer, bill payment, withdrawal, deposit, and/or the like.

In one embodiment, the customer 114 can use a variety of communication devices and channels to access an account or engage in a transaction involving the account. For example, the customer 114 may use a customer terminal 112, such as a mobile telephone, personal computer, or other computing device, to communicate with the financial institution's computer system 130 via the network 110. The customer 114 may also use other devices and channels, such as an ATM 109, Internet server 108, and/or standard telephone system 106, to communicate with the financial institution's computer system 130 via the network 110. In some instances, the customer 114 calls or meets with an employee 104, such as a customer service representative at a call center or branch location, or other agent of the financial institution, and the employee 104 uses an employee terminal 102, such as a personal computer or computer workstation, to communicate with the financial institution's computer system 130.

Although not illustrated in FIG. 1, each communication channel generally includes a user interface for interacting with a user, such as the customer 114 or employee 104, in order to: receive requests to access or use an account from the user; provide the user with authentication questions; and receive answers to the authentication questions from the user. As used herein, a "user interface" generally includes one or more user input and/or output devices for communicating with a user, such as a display, touch screen, touchpad, keyboard, mouse, joystick, pointing device, keypad, button, speaker, microphone, LED, and/or the like. Each communication channel generally also includes a network communication interface configured to communicate with one or more other devices on the network 110.

The network 110 may comprise any type of network or combination of networks and may, for example, include a global area network, wide area network, local area network, and/or any other direct or indirect wireline or wireless connection between two devices. The network 110 may include one network or a plurality of separate networks and connections.

As illustrated in FIG. 1, the financial institution's computer system 130 generally includes a communication interface 132, a memory 136, and a processor 134. The processor 134 is operatively coupled to the communication interface 132 and the memory 136. As used herein, saying that two devices are "operatively coupled" generally indicates that the devices are structured such that they can interact with one another to perform one or more functions. The two devices may or may not be physically coupled to one another.

As used herein, a "communication interface" generally includes hardware and/or software configured to send and/or receive electronic input from other devices, such as other devices on the network 110. For example, a communication interface may include such devices as a server, modem, cable input, cable output, electronic connection, wireless transceiver, and/or the like, as well as any software that allows the device to communicate with other devices on the network 110 using one or more communication protocols. The communication device may also include a user interface having one or more user input and/or output devices for communicating with a user, such as a display, touch screen, touchpad, keyboard, mouse, joystick, pointing device, keypad, speaker, microphone, LED, and/or the like. As used herein, a communication interface may include one device or a number of separate or linked devices.

As used herein, "memory" generally includes computer-readable storage medium for storing computer-executable program code and/or datastores of data and/or databases. For example, memory may include volatile memory, such as volatile Random Access Memory (RAM) including a cache area for the temporary storage of data. Memory may also include non-volatile memory that can be embedded and/or may be removable such as, for example, EEPROM, flash memory, and/or the like. The memory device can store any of a number of pieces of information, instructions, and data used by the system in which the memory exists to implement one or more of the system's functions described herein. As used herein, a memory may include one memory device or a number of separate or linked memory devices.

As used herein, a "processor" generally includes circuitry used for implementing communication and/or logic functions of the system in which the processor resides. For example, a processor may include a digital signal processor device, a microprocessor device, and/or various analog-to-digital converters, digital-to-analog converters, and other support circuits. Control and signal processing functions of the system are allocated between these devices according to their respective capabilities. A processor may include functionality to operate one or more software programs based on computer-executable program code thereof, which may be stored in a memory. As used herein a processor may include one processor device or a number of separate or linked processor devices.

FIG. 2 provides a flow diagram illustrating a process 200 of customer authentication, in accordance with an embodiment of the present invention. As illustrated by block 210 in FIG. 2, the financial institution's computer system 130 is configured to receive a request from a customer 114 (or other person) to access or use an account, such as a credit account, debit account, or online banking account, that the financial institution's computer system 130 maintains. More particularly, the financial institution's communication interface 132 receives a communication via network 110 from one of the various different communication channels described above. For example, a customer 114 (or other authorized or unauthorized person) may be trying to log into an online banking account or may already be logged into an online banking system and may be trying to make a transaction using the online banking system. In another example, the customer 114 may be trying to make a transaction using a credit card, debit card, or other payment device at an ATM or a POS terminal. In still another example, a customer may be trying to receive account information over the phone through an automated telephone system or by speaking to a customer service representative.

In any event, the request to access or use a customer's account typically includes information identifying an account and/or a customer. If the request is one involving using an account for a transaction, the request typically also includes information about the requested transaction. The processor 134 can then use the information identifying the account and/or the customer to access information about the account and/or customer stored in a customer/account information datastore 138 stored in the memory 136. The information about the account and/or the customer may include such account information as the account balance, transaction history (including, in some cases, transaction amount, transaction type, date, merchant, geographic location, itemized receipt information, and/or the like).

In some embodiments, where there are multiple customers associated with one account, the information in the datastore 138 distinguishes between the customers where possible. For example, if each customer 114 on a shared account has his or her own bank card number, login ID, or other identifier, the financial institution's computer system 130 may be able to determine which customer 114 made each transaction and, therefore, may be able to avoid asking a customer 114 with a shared account authentication questions that might only be known by the other customer 114 associated with the shared account. In some embodiments, the information about the account and/or the customer may include other information gathered or generated by the financial institution's computer system 130, such as historical information, for example, where the customer 114 opened his first bank account with the financial institution, or behavioral information, such as the ATM most frequently used by the customer 114.

In some embodiments, the financial institution's computer system 130 uses a risk engine 170 to determine risk associated with the request to access or use an account, as represented by block 215 in FIG. 2. As described in greater detail below, such a risk rating may be used by the financial institution's computer system 130 and/or the authentication engine 140 when determining, for example, whether to ask dynamic authentication questions, how many questions should be asked, what type of question should be asked, how difficult/specific should a question be, how much time should be given to the customer 114 to answer the question correctly, how many failed attempts to answer authentication questions will be permitted, and/or the like.

As illustrated in FIG. 1, the risk engine 170 generally includes a communication interface 172 configured to permit communication with one or more other devices on the network 110, a memory 176 for storing the datastores and/or computer-executable program code of a risk application 177 that instructs a processor to perform the functions of the risk engine 170, and a processor 174 operatively coupled to the communication interface 172 and the memory 176 and configured to execute the risk application stored in the memory 176.

FIG. 3 provides a flow diagram illustrating a process 300 of generating a risk rating associated with each request to access or use an account, in accordance with an embodiment of the present invention. As represented by block 310 in FIG. 3, the risk engine 170 receives information about the request. For example, the information received by the risk engine's communication interface 172 from the financial institution's computer system 130 may include information about the account, customer, transaction, channel of communication, location of the person requesting authentication, address of the customer, and/or any other information related to the request that may provide an indication of the probability that a misrepresentation will occur, or of the extent and type of losses that could result from a misrepresentation.

As represented by block 320 in FIG. 3, the processor 174 executes the risk application 177 to generate a risk rating based at least partially on one or more rules stored in a memory (such as the authentication rules datastore 139 stored in the memory 136), historical records of past misrepresentations, and/or the information received about the request. The risk rating may be anything that can indicate a level of risk, such as a numerical score, probability, dollar amount, classification, word, and/or phrase. The risk rating determination could be based on many factors, such as accumulated data, transactional parameters (e.g. merchant, country code, amount, frequency, IP address, communication channel, etc.), behavioral parameters (e.g., customer's past authentication attempts, etc.), input from misrepresentation detection services over the network 110, account information (e.g., account type, money available through the account, information available through the account, security classification, past malicious activity associated with the account or customer, etc.) and/or any other information. For example, if the request involves an online transaction and the transaction amount is for an uncommonly high-value amount, it may be flagged as "high risk." Other factors that may contribute to a "high risk" label or a high-risk score may include, for example, a customer's IP address or ATM location being located in a high-risk area and/or activity commonly associated with misrepresented activity, such as multiple withdrawals in a short time frame, multiple banking access attempts from different IP addresses, multiple purchases of high-value goods in a short time frame, etc. As another example, if the customer/account information datastore 138 and/or the authentication archive datastore 137 show that the specific customer 114 performs the same transaction at the same time on a weekly basis and has been consistently authorized to do so, and this is not an unusual transaction, then the risk engine 170 may determine that a lower risk rating is justified for the specific transaction.

As represented by block 330 in FIG. 3, after the risk engine 170 generates a risk rating or a request, the risk engine 170 uses its communication interface 142 to provide the risk rating to the financial institution's computer system 130 (or the authentication engine 140, as the case may be) so that the financial institution's computer system 130 (or the authentication engine 140) can use the risk rating during other authentication steps and processes, as described in greater detail below.

Referring again to FIG. 2, as represented by block 220 in FIG. 2, in one embodiment the financial institution's computer system 130 determines whether authentication of the customer 114 using dynamic authentication questions should be performed before allowing the customer 114 to access the account or use the account as requested. For example, there may be some requests where the financial institution decides that dynamic authentication questions should not be required based, for example, on the low risk of the transaction/request, the low dollar amount, other authentication procedures in place, customer demand, the capabilities of the communication channel to present authentication questions to a person and return the person's answers, and/or the frequency of the request. For example, in one embodiment, a debit card transaction at a fast food restaurant may not trigger authentication questions, but a debit card transaction involving the purchase of a new automobile may trigger authentication questions. In another example, in one embodiment an attempt to log into an online banking account may only require a customer's login ID and password if the financial institution's computer system 130 recognizes the computer being used for the attempt (e.g., through cookies stored on the computer or through the IP address), but require the dynamic authentication questions in addition to the login ID and password if the financial institution's computer system 130 does not recognize the computer. The decision regarding whether to ask dynamic authentication questions, in one embodiment, is based at least partially on the authentication rules datastore 139 stored in the memory 136.

As described above with reference to block 215 and FIG. 2, in some embodiments, the financial institution's computer system 130 accesses the risk engine 170 to determine a risk rating that provides an indication to the financial institution of the risks associated with the requested authentication. In such an embodiment, the financial institution's computer system 130 may determine if dynamic authentication questions should be asked based at least partially on the risk rating for the request.

As represented by block 250 in FIG. 2, if the financial institution's computer system 130 determines that dynamic authentication questions are not needed for the particular request, then the financial institution's computer system 130 allows the request and permits access to the account or proceeds with the transaction, as the case may be. However, as represented by block 225, if the financial institution's computer system 130 determines that dynamic authentication questions are needed for the particular request, then the financial institution's computer system 130 uses the authentication engine 140 to generate one or more dynamic authentication questions and answers in accordance with rules in the authentication rules datastore 139.

As illustrated in FIG. 1, the authentication engine 140 generally comprises a communication interface 142 configured to permit communication with one or more other devices on the network 110, a memory 146 for storing the datastores and/or computer-executable program code of an authentication application 147 that instructs a processor to perform the functions of the authentication engine 140, and a processor 144 operatively coupled to the communication interface 142 and the memory 146, and configured to execute the authentication application 147 stored in the memory 146. As described above, in one embodiment authentication engine 140 is integrated into the financial institution's computer system 130 and the separation between the two systems and some or all of its components is merely conceptual. However, in one embodiment, the authentication engine 140 is separate. In one exemplary embodiment, the authentication engine 140 is configured to act as an online widget that can be called by any website seeking authentication. In this way, in some embodiments, the authentication engine 140 can be easily used for providing authentication of a customer on any website or other channel, not just for the financial institution, but also for any third parties willing to engage the authentication services of the financial institution.

FIG. 4 is a flow diagram illustrating a process 400 of generating authentication questions, in accordance with an embodiment of the present invention. As represented by block 410 in FIG. 4, the authentication engine's communication interface 142 is configured to receive a request for authentication questions from the financial institution's computer system 130. Such a request for authentication questions generally includes information about the customer's request to access or use an account, such as, but not limited to, customer and/or account identifiers, a risk rating for the request, the channel of communication from which the customer's request was received, the customer's current access rights to the account if any, and/or the like.

As represented by block 420 in FIG. 4, the authentication engine 140 then determines the number of questions to present to the customer during the authentication process for this particular request. For example, in one embodiment, the authentication engine 140 makes the determination about the number of questions based on the authentication rule in the authentication rules datastore 139 and/or on the risk rating. For example, in one embodiment, the higher the risk rating (i.e., the greater the risk to the customer or financial institution), the more authentication questions the authentication engine 140 may be configured to generate. In some embodiments, the authentication engine 140 may also make determinations about the number of questions to ask based on other factors, such as a strength rating for the questions (e.g., one "difficult" question may be equal to two or more "easy" questions). In some embodiments, the authentication engine 140 may, in accordance with rules in the authentication rules datastore 139, generate a certain number of extra questions for each request so that the questions are readily available if the person answers the question incorrectly and is entitled to one or more additional attempts, or, if a person answers a question correctly but takes longer than a certain amount of time to do so, then the person may, in some embodiments, receive an additional attempt to answer an authentication question.

As represented by block 430 in FIG. 4, the authentication engine 140 accesses the financial institution's customer/account information datastore 138 to obtain information about the account and/or the customer 114.

As represented by block 440, in one embodiment, the authentication engine 140 determines whether there is sufficient information in the customer/account information datastore 138 to generate the one or more authentication questions needed for the authentication request. For example, if the customer 114 has a mortgage with the financial institution 130, the authentication engine 140 may have enough information to generate such a dynamic question as "What is the amount of your monthly mortgage payment?" or, if the customer has an ATM card with the financial institution 130, one dynamic question may be "What amount did you withdraw from the ATM last night?" or "What ATM location do you make 95% of your withdrawals from?" In contrast, for example, where the customer 114 only just recently opened an account with the financial institution 130, there may not be enough information about the account to generate enough authentication questions for a particular request.

Furthermore, in some embodiments, not only is the determination made by the authentication engine in block 440 based on the amount of a certain type of information available in the customer/account information datastore 138, but it may also be based on other factors and information, such as information in the authentication archive datastore 137 and one and/or more rules from the authentication rules datastore 139. For example, in one embodiment, the authentication engine 140 may communicate with the authentication archive datastore 137 and determine relevant authentication history specific to this customer 114. If, for example, the customer 114 has already seen all possible authentication questions within a certain period of time or number of authentication attempts as defined by a rule in the authentication rules datastore 139, then the authentication engine 140 may determine that there is not sufficient information available to generate the one or more authentication questions for this request. The authentication rules datastore 139 may be unique to a financial institution 130, unique to a certain channel of authentication, unique to an account, and/or unique to a customer.

It is important to note that the authentication engine 140 is frequently, if not constantly, mining the customer/account information datastore 138 for newer information, so, as new authentication questions are available, the new questions can be presented to the customer 114. Furthermore, it is important to note that, in some embodiments, such as where the account is a financial account, the customer/account information datastore 138 is updated in real-time or near-real-time, which often allows for a consistent supply of fresh authentication questions that are based on events recent enough to be remembered by the customer 114 and/or accurately portray current customer behavior.

As represented by block 450 in FIG. 4, in one embodiment if the authentication engine 140 determines that there is not sufficient information in the customer/account information datastore 138 to generate the necessary one or more authentication questions for the request, then the authentication engine 140 may decide to try and obtain dynamic authentication questions or information that can be used to generate one or more dynamic authentication questions from a third-party provider, such as a third-party question generator 160. In such an instance, the authentication engine 140 may provide information to the third-party provider that identifies the customer 114 and, in response, receive one or more questions or information about the customer 114.

In one embodiment, the third-party provider is another financial institution, such as a bank that the customer 114 has an account with, or a credit monitoring agency that has up-to-date information about the customer 114, or has dynamic question generating capabilities.

As represented by block 460, if the authentication engine 140 determines that there is enough information or receives enough information from a third-party provider to generate the dynamic authentication questions in accordance with one or more authentication rules, then the authentication engine 140 generates one or more authentication questions based on, for example, information about the request, authentication rules 139, risk rating, and/or the authentication archive datastore 137. In one embodiment, the authentication engine 140 accesses the authentication archive datastore 137 to review past authentication questions and/or answers to make sure that questions and/or answers are not repeated for a particular customer and/or account within a certain predefined time and/or predefined number (e.g., 2, 3, 4, 5, 10, 20, or any other number) of authorization requests based on one or more authentication rules 139. These rules may be institution-wide, system-wide, account-specific, customer-specific, transaction type-specific, communication channel-specific, and/or risk rating-specific.

Naturally, the authentication engine 140 also generates the answers so that they can be compared to the customer's answers. In some embodiments, the authentication questions include multiple choice questions, so, in such embodiments, the authentication engine 140 may also be configured to generate enough well-thought-out wrong answers for a multiple choice question. For example, where the answer to a multiple choice question is the name of a merchant, the authentication engine may be configured to generate the names of other merchants that are present in the geographic region as the first merchant and sell similar products as the first merchant, and then use these other merchants as the wrong answers to the multiple choice question. In other embodiments, the authentication question format is that of a true/false question, a fill-in-the-blank question, or a text-based answer question. In some embodiments, the authentication question format changes constantly, which may be a desired feature to prevent web bots or other malicious software from trying to log into a user's account by repeated attempts, since the format of the question, and therefore the answer, would change often and unexpectedly.

In one embodiment of the invention, the authentication engine 140 divides the types of authentication questions that can be generated into three types: transactional questions, historical questions, and behavioral questions. A transactional question is transaction-specific. For example, "Where did you spend $500 last week?" A historical question generally asks a historical type-question, such as, for example, "In which banking center did you open up your account?" or "You recently banked at a branch in which of the following states?" A behavioral question is generally directed towards habits, such as habits the customer has when using the account. For example, "Ninety-five percent of your deposits are made at which location?" In one embodiment, the authentication engine 140, randomly or according to certain authentication rules, rotates between these types of questions. In some embodiments, the authentication engine 140 considers a certain question or type of question to be more difficult than others and provides these to the user based on the difficulty, such as based on the risk rating.

As represented by block 470 in FIG. 4, the authentication engine 140 then provides the one or more authentication questions and answers to the financial institution's computer system 130 so that the financial institution's computer system 130 can use the questions for authentication of the customer 114.

Referring again to FIG. 2, as represented by block 230, the financial institution's computer system 130 then provides the one or more authentication questions to customer 114 by, for example, communicating the questions over the network 110 to a customer terminal 112, ATM 109, Internet server 108, telephone system 106, employee terminal 102, or the like, where the questions are displayed on a screen or otherwise provided to the customer 114 (or employee 104, unauthorized person, or other person) using another user output device.

As represented by block 235, the customer 114 or other person enters a response to the question which is then received by the financial institution's computer system 130 where it is scored and/or verified, or where it is presented to the authentication engine 140 where it is scored and/or verified, as represented by block 240. In addition to receiving response(s), the financial institution's computer system 130 and/or the authentication engine 140 receives and verifies the response time. This may be the time elapsed between when the authentication question(s) was presented to the customer 114 and when the customer 114 answered the authentication question(s).

Although some embodiments of the invention may disregard the response time, in one embodiment, the financial institution's computer system 130 or the authentication engine 140 takes the response time into account when scoring the questions and determining whether the customer 114 was authenticated. For example, the customer's response time may be five minutes. The authentication rules datastore 139 may, in one example embodiment, contain response time rules which say that response times under two minutes do not affect authentication, response times between two and six minutes require another authentication question, and response times over six minutes require that authentication be denied. The authentication engine 140 may query the authentication rules datastore 139 and determine that, based on the customer's response time of five minutes, it needs to ask another authentication question. In one embodiment, the response time rules are dependent on risk rating, communication channel, account, customer, question type, question, question format, or other factors.

In another embodiment, response times may be decreased by a factor which affects overall scoring. For example, in one embodiment, the authentication engine 140 may query the authentication rules datastore 139 and determine that a customer 114 needs a weighted score of 80 or above in order to pass authentication. The authentication engine 140 may provide two questions (or one at a time) where each question may carry a weight of 50 without the time response factor. If the customer answers both questions correctly in three minutes, the authentication engine 140 may query the authentication rules datastore 139 to determine the affect of the response time. For example, in this embodiment, the authentication rules datastore 139 may specify that answer scores with response times under two minutes are not decreased by any factor, answer scores with response times between two-six minutes are decreased by a factor of 20% and answer scores with response times above six minutes are decreased by a factor of 50%. In this example, the authentication engine 140 would determine that the weighted score should be decreased by a factor of 20%, and thus, it would have a weighted score of 80. The authentication engine 140 would then verify that 80 is a passing score with the authentication rules datastore 139 and then proceed to archive the results with the authentication archive datastore 137. The authentication engine 140 would then send an authentication message to the customer terminal 112 or other device over the network 110, and allow the customer to proceed, as represented by block 250.

If in the preceding example embodiment, the response time was 8 minutes, the authentication engine 140 may decrease the score according to the authentication rules datastore 139 by 50%, thus giving the customer an overall score of 50. The authentication engine 140 would then store the results in the authentication archive datastore 137. At this point, the authentication engine 140 may determine that authentication failed since the overall score does not match the score required by the authentication rules datastore 139. In one example, the method may be re-initiated, and the authentication engine 140 would repeat the authentication process. In another embodiment, however, the authentication engine 140 may only allow one chance at authentication and proceed to send an "access denied" message to the customer 114 over the network 110, and thus, deny the customer 114 and/or any requested transaction from proceeding, as represented by block 245.

As represented by block 255, in one embodiment, the authentication process is recorded for each account and/or user in the authentication archive datastore 137. In such an embodiment, the information stored therein may include authentication questions, answers, passes, fails, response times, and/or the like for each customer and/or account. As described above, this authentication archive datastore 137 may be used for numerous purposes, including, for example, by the authentication engine 140 to determine, when it generates and provides authentication questions, that authentication questions and/or answers are not often repeated for the same customer or account, in accordance with certain predefined authentication rules 139.

Referring now to FIG. 5, an illustration is provided of a graphical user interface 500 where a customer is attempting to log-in online to his/her personal-banking website, in accordance with an embodiment of the present invention. In this example embodiment, a customer may try to log-in to his/her personal banking website over the Internet and the customer terminal may be the customer's personal computer. When the customer attempts to connect to the financial institution through the network, the authentication engine establishes a connection with the customer terminal through the network. As shown by FIG. 5, the authentication engine communicates with the customer datastore to get the customer's identification information including, but not limited to, its customer terminal information. In the illustrated example, the authentication engine does not recognize the customer terminal information and may then query the authentication rules datastore to determine whether it should attempt to authenticate the customer.

In this example, the authentication engine determines that authentication questions should be provided as an additional security step. In this example, the authentication engine queries the customer datastore and determines that it has enough information to generate its own authentication question. Accordingly, the authentication engine displays the transactional question through a server over the network to the customer terminal for the customer to answer. As FIG. 5 shows, in this example, the question asks the customer to identify the store where he/she made a $500 purchase over the weekend.

FIG. 6 provides another illustration of a graphical user interface 600 illustrating authenticating a customer attempting to transfer funds from his/her personal-banking online account after the customer has already logged into the online account, in accordance with an embodiment of the present invention. This is another example where the customer terminal is a personal computer and the network is the Internet. In this example, although the customer has accessed his or her personal banking website, the customer is now trying to transfer money to another account. Since, in one embodiment, this may be considered a high-risk transaction (based, for example, on the amount of the requested transfer), the authentication engine may require additional authentication through one or more dynamic security questions.

In this example, the authentication engine displays a historical question, in this case, "where does the customer make ATM deposits 95% of the time." The customer submits his/her answer at the customer terminal and when the customer hits the "submit" button, the customer's response and response time are sent directly over the network to the authentication engine for processing/verification.

It should be appreciated that, although embodiments of the invention can include authentication questions generated by any third-party entity, about any topic, and using any information, certain embodiments of the invention where the authentication questions are generated by and/or from information collected or maintained by banks and other financial institutions may be particularly well-suited for this purpose. More particularly, financial institutions have significant pools of customer-specific data with which to make authentication questions more dynamic and effective, since they have specific knowledge regarding a significant amount of a customer's dynamic information, such as mortgage payments, ATM visits, cash withdrawals, purchases, geographic movement, and/or other transactions or the like.

Furthermore, the above embodiments are described in the context of customer authentication over several different channels and media. It is understood that the systems and methods of embodiments of the present invention may be used to authenticate any customer information over any channel. For example, such a system could be used to authenticate a user in an online transaction where visual access to the user's identification card or other information is not possible, or it can also be used to authenticate a customer who is attempting to activate a credit card over the telephone. As used herein and in the claims, the phrase "bank card" includes credit cards, debit cards (including check cards and ATM cards), and the like. The phrases "bank card transaction" and "credit or debit card transaction" include both in-person bank card transactions and online transactions using account information stored on or otherwise associated with a bank card. Although the phrases "bank card" and "bank card transaction" use the term "bank," it is understood that, in some embodiments, the bank card may be issued by, and the bank card transaction may involve, a financial institution other than a traditional bank, and, therefore, these phrases are not to be limited to traditional banks by the mere use of the term "bank" in the phrases, unless the context explicitly states otherwise. Furthermore, although the phrases "bank card" and "bank card transaction" use the term "card," it is understood that, in some embodiments, the "bank card" may not be a card in the traditional sense, and may be another payment device that serves the same or a similar function as that of a bank card, such as a radio frequency identification (RFID) tag configured to store account identifying information and communicate it to, for example, a point-of-sale terminal.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system comprising:
 a communication interface configured to receive an electronic request to access a financial account requiring authentication that a person is authorized to access the financial account; and
 a processor operatively coupled to the communication interface and configured to use the communication device to:
  access a datastore maintained by the institution, the datastore comprising information gathered by the institution about use of the financial account or behaviors of an authorized person when using the financial account;
  determine that there is insufficient information in the datastore to generate one or more authentication questions for a request requiring authentication;
  use the communication interface to communicate with a third-party provider of authentication questions or information about an authorized person that can be used to generate one or more authentication questions;

generate authentication questions based at least in part on the electronic request and information about the financial account, wherein the authentication questions generated include one or more of financial behavior, financial history, or financial transaction associated with the financial account;

provide authentication questions each time a request is received requiring authentication to access or use the financial account, wherein the processor is configured to provide the authentication questions such that the authentication questions are not repeated in two or more consecutive requests;

track an amount of time between providing the authentication questions generated and receiving answer responses in response to the authentication questions provided;

determine whether the amount of time is less than or equal to a first predetermined threshold period;

in response to determining the amount of time is less than or equal to the first threshold period, authorize access to the financial account based on the answer responses received for the authentication questions;

in response to determining the amount of time is greater than the first threshold period but less than or equal to a second threshold period, provide an additional authentication question; and in response to determining the amount of time is greater than the second threshold period, reject the request to access the financial account.

2. The system of claim 1, wherein the processor is further configured to:
access a datastore including information about the account or the authorized person, wherein the information about the account or the authorized person is updated in real-time or near-real-time; and
generate an authentication question based on information about the request and information stored in the datastore about the account or the authorized person.

3. The system of claim 1, wherein the one or more authentication questions comprise a question about a prior use of the account.

4. The system of claim 3, wherein the question about a prior use of the account comprises a question about a prior transaction involving the account.

5. The system of claim 3, wherein the question about a prior use of the account comprises a question about a behavior of an authorized person when using the account.

6. The system of claim 5, wherein the question about a behavior of an authorized person when using the account comprises a question about an authorized person's use of one or more automated teller machines.

7. The system of claim 1, wherein the account is maintained by an institution, and wherein the processor is further configured to:
access a datastore maintained by the institution, the datastore comprising information gathered by the institution about use of the account or behaviors of an authorized person when using the account; and
generate one or more authentication questions from the information stored in the datastore.

8. The system of claim 1, wherein the account is maintained by an institution, and wherein the processor is further configured to
provide one or more authentication questions based at least partially on authentication questions or information received from the third-party provider.

9. The system of claim 8, wherein the third-party provider comprises a credit reporting agency.

10. The system of claim 1, wherein the communication device is configured to receive the request through at least one of a plurality of different communication channels, and wherein the processor is configured to provide the one or more authentication questions based at least partially on the communication channel from which the request is received.

11. The system of claim 10, wherein the plurality of communication channels comprise a telephone system channel, a customer service representative channel, an online channel, and a mobile channel.

12. The system of claim 1, wherein the processor is configured to provide the one or more authentication questions based at least partially on the location or account access rights of the person requesting authentication.

13. The system of claim 12, wherein the request requiring authentication comprise a request to authenticate a person with access to an account that is attempting to make a transaction using the account, wherein the processor is configured to provide one or more authentication questions that cannot be answered using information available via the person's access to the account.

14. The system of claim 1, wherein the processor is further configured to:
determine a risk rating for the request; and
provide one or more authentication questions for the request based at least partially on the risk rating for the request.

15. The system of claim 14, wherein the processor is configured to determine the risk rating for the request based at least partially on the amount of a requested transaction, an amount associated with the account, a channel of communication from which the request was received, a location of the person requesting authentication, the account's history, a type of account, or a type of transaction.

16. The system of claim 1, wherein the processor is further configured to:
store, in a memory, a history of the one or more authentication questions provided for the account in the past; and
provide the one or more authentication questions to the person based at least partially on the history.

17. The system of claim 16, wherein the processor is configured to use the history so as to not provide the same one or more authentication questions to a person for the account within a predefined period of time or number of authentication requests.

18. The system of claim 1, wherein the processor is configured to:
perform one or more functions by executing computer-executable program code embodied in a non-transitory computer-readable medium, wherein the computer-executable program code is configured to instruct the processor to perform the one or more functions.

19. The system of claim 1, wherein the processor is configured to:
track response time needed for the person to provide an answer to the authentication question; and
determine an authentication decision based at least partially on the answer and the response time.

20. A system comprising:
a communication interface receiving a request to authenticate that a person is authorized to access a financial account; and a processor operatively coupled to the communication interface and configured to:

access a datastore including information about the financial account or a person authorized to access the financial account, wherein the datastore information about the financial account or the person authorized to access the financial account is updated in real time or near real time;

determine that there is insufficient information in the datastore to generate one or more authentication questions for a request requiring authentication;

use the communication interface to communicate with a third-party provider of authentication questions or information about an authorized person that can be used to generate one or more authentication questions;

determine authentication questions based on information about the request, information associated with the third-party provider, and information stored in the datastore about the account or the person authorized to access the financial account, wherein the authentication questions determined include one or more of financial behavior, financial history, or financial transaction associated with the financial account;

use the communication interface to provide the authentication questions in response to the request received, wherein the authentication questions are provided such that any two consecutive requests to access the financial account are provided different authentication questions;

track an amount of time between providing the authentication questions generated and receiving answer responses in response to the authentication questions provided;

determine whether the amount of time is less than or equal to a first predetermined threshold period;

in response to determining the amount of time is less than or equal to the first threshold period authorize access to the financial account based at least in part on the answer responses received for the authentication questions;

in response to determining the amount of time is greater than the first threshold period but less than or equal to a second threshold period, provide an additional authentication question; and in response to determining the amount of time is greater than the second threshold period, reject the request to access the financial account.

21. A method comprising:

receiving, using a communication interface, an electronic request to access a financial account requiring authentication that a person is authorized to access the financial account;

accessing a datastore maintained by the institution, the datastore comprising information gathered by the institution about use of the financial account or behaviors of an authorized person when using the financial account;

determining that there is insufficient information in the datastore to generate one or more authentication questions for a request requiring authentication;

using the communication interface to communicate with a third-party provider of authentication questions or information about an authorized person that can be used to generate one or more authentication questions;

generating authentication questions based at least in part on the electronic request and information about the financial account, wherein the authentication questions generated include one or more of financial behavior, financial history, or financial transaction associated with the financial account;

providing, using a processor, automatically in response to the electronic request, the authentication questions generated based on the electronic request such that any two consecutive electronic requests to access the financial account generate different authentication questions, wherein correct answer responses for the different authentication questions in any two consecutive electronic requests are different;

tracking an amount of time between providing the authentication questions generated and receiving answer responses in response to the authentication questions provided;

determining whether the amount of time is less than or equal to a first predetermined threshold period;

in response to determining the amount of time is less than or equal to the first threshold period, authorizing access to the financial account based on correct answer responses received for the authentication questions;

in response to determining the amount of time is greater than the first threshold period but less than or equal to a second threshold period, providing additional authentication questions; and in response to determining the amount of time is greater than the second threshold period, rejecting the request to access the financial account.

22. The method of claim 21, further comprising:

updating, in real time or near real time, information in a datastore stored in a memory, the datastore including information about the account or the authorized person;

accessing the datastore; and generating an authentication question based on information about the request and information stored in the datastore about the account or the authorized person.

23. The method of claim 21, wherein the one or more authentication questions comprise a question about a prior use of the account.

24. The method of claim 21, wherein the account is maintained by an institution, and wherein the method further comprises:

accessing a datastore maintained by the institution, the datastore comprising information gathered by the institution about use of the account or behaviors of an authorized person when using the account; and generating one or more authentication questions from the information stored in the datastore.

25. The method of claim 21, further comprising:

receiving the request through at least one of a plurality of different communication channels; and providing the one or more authentication questions based at least partially on the communication channel from which the request is received.

26. The method of claim 21, further comprising:

providing the one or more authentication questions based at least partially on the location or account access rights of the person requesting authentication.

27. The method of claim 21, further comprising:

determining a risk rating for the request; and providing one or more authentication questions for the request based at least partially on the risk rating for the request.

28. The method of claim 21, further comprising:

storing, in a memory, a history of the one or more authentication questions provided for the account in the past; and providing one or more authentication questions to the person based at least partially on the history.

29. The method of claim 21, where the one or more authentication questions comprise a multiple choice question or a true/false question.

\* \* \* \* \*